United States Patent Office 2,809,957
Patented Oct. 15, 1957

2,809,957
POLYURETHANE RESINS FROM 2,5-DIMETHYL-2,5-DI(2'-HYDROXYETHOXY)-3-HEXYNE

Alio J. Buselli, New Providence, N. J., assignor to Air Reduction Company, Incorporated, New York, N. Y., a corporation of New York No Drawing. Application February 21, 1955,
Serial No. 489,797

8 Claims. (Cl. 260—77.5)

The present invention relates to new compositions of matter and to a method for preparing the same. More particularly it relates to novel polyurethane resins and to a method for their preparation.

The broad object of this invention is to provide a new class of chemical compounds from polyisocyanates and 2,5-dimethyl-2,5-di(2'-hydroxyethoxy)-3-hexyne, the mono-adduct of ethylene oxide and 2,5-dimethyl-3-hexyne-2,5-diol. A particular object is the provision of novel and improved polyurethane resins which are stable, adhere firmly to different surfaces, and possess excellent strength properties.

The novel polyurethane resins may be used as lacquers, organic coatings, or adhesives. These resins mixed with a suitable solvent, such as ethyl acetate, provide lacquers which are excellent in water resistance. In the field of organic coatings, the novel resins are useable over a wide range of temperatures and are characterized by superior vapor transmission properties. A wire coated with a novel resin can be dip soldered without removing the insulating material. The novel resins are also useful as adhesives because of their high tensile strengths, excellent adhesive properties, and stability.

The reactant, 2,5-dimethyl-2,5-di(2'-hydroxyethoxy)-3-hexyne, can be prepared according to the process of the copending application of Gilbert B. Carpenter, Morton W. Leeds, and Sidney Gister, Serial No. 489,796, filed concurrently herewith, namely "Mono-Adducts of Ethylene Oxide and Acetylenic Glycols."

In its broader aspects, the present invention comprises a resin formed by the reaction of 2,5-dimethyl-2,5-di(2'-hydroxyethoxy)-3-hexyne and a polyisocyanate in a liquid medium which is substantially inert with respect to such reactants and products of reaction.

In carrying out the invention, any polyisocyanate may be used. Typical examples include the aliphatic compounds such as tetramethylene and hexamethylene diisocyanates; the cycloalkylene compounds such as cyclohexylene-1,4 diisocyanate and cyclohexylene-1,2 diisocyanate; the aromatic compounds such as 4,4'-diphenyl diisocyanate and 1,5-naphthalene diisocyanate; and the nuclear substituted aromatic compounds such as 3,5-tolyl diisocyanate and 4,4'-diphenylmethylene diisocyanate.

In the preparation of the novel resins in general, the polyisocyanate and 2,5-dimethyl-2,5-di(2'-hydroxyethoxy)-3-hexyne are usually dissolved in a suitable inert organic liquid medium such as dry toluene or methyl ethyl ketone. The solutions are stirred together and permitted to stand. The resin formed separates from the solution and is removed therefrom by precipitation. After separating and drying, a relatively hard resin is obtained. The time required for the resin to form will vary depending upon the particular reactants used in the process.

While the following examples will serve to illustrate the invention more fully, they are not to be construed as limiting the scope of the invention.

Example 1

A mixture of 3,5-tolyl diisocyanate (3.94 g., 0.0226 mole), 2,5-dimethyl-di(2'-hydroxyethoxy)-3-hexyne (the mono-adduct of ethylene oxide and 2,5-dimethyl-3-hexyne-2,5-diol) in an amount of 5.2 g. (0.0226 mole), and 24.0 ml. dry toluene was formed in a flask equipped with a water separator and reflux condenser. The mixture was refluxed over a period of six hours. A polymerized layer comprising the novel resin appeared below the layer of solvent (toluene). The polymerized layer was separated from the solvent by the use of a solvent extractor which combined heat and vacuum to remove the solvent. The resulting novel resin was relatively hard and possessed good adhesion or bond strength. A yield of 92% (8.4 g.) was obtained. The polymeric resin was soluble in acetone, methanol, ethyl acetate, boiling benzene, and boiling toluene. The resin can be precipitated from any of three solutions by adding hexane or diethyl ether.

Example 2

A mixture of 4,4'-diphenylmethylene diisocyanate (5.0 g., 0.020 mole), 2,5-dimethyl-di(2'-hydroxyethoxy)-3-hexyne in an amount of 4.6 g. (0.020 mole), and 24.0 ml. dry toluene was formed in a flask equipped with a reflux condenser and a water separator. The reaction mixture was heated over a period of six hours at reflux temperature. A polymer comprising the novel resin separated from the solvent (toluene). The solvent was evaporated, and the resulting resin was dried in an oven under a 30 lb. vacuum and at a temperature of 50° C. The product was relatively hard, milky white in color, with excellent adhesive properties. A yield of 98% (9.5 g.) was obtained.

It should be understood that the invention is not limited to the specific embodiments and details described above but may be practiced in other ways without departing from the spirit or scope of the invention.

I claim:

1. As new compositions of matter, the resinous polyurethane reaction products of 2,5-dimethyl-2,5-di(2'-hydroxyethoxy)-3-hexyne and a polyisocyanate selected from the group consisting of aliphatic, aromatic, and cycloalkylene polyisocyanates.

2. As new compositions of matter, the resinous polyurethane reaction products of 2,5-dimethyl-2,5-di(2'-hydroxyethoxy)-3-hexyne and a diisocyanate selected from the group consisting of aliphatic, aromatic, and cycloalkylene diisocyanates.

3. As new composition of matter, the resinous polyurethane reaction product of 2,5-dimethyl-2,5-di(2'-hydroxyethoxy)-3-hexyne and hexamethylene diisocyanate.

4. As new composition of matter, the resinous polyurethane reaction product of 2,5-dimethyl-2,5-di(2'-hydroxyethoxy)-3-hexyne and 1,5-naphthalene diisocyanate.

5. As new composition of matter, the resinous polyurethane reaction product of 2,5-dimethyl-2,5-di(2'-hydroxyethoxy)-3-hexyne and 3,5-tolyl diisocyanate.

6. As new composition of matter, the resinous polyurethane reaction product of 2,5-dimethyl-2,5-di(2'-hydroxyethoxy)-3-hexyne and 4,4'-diphenylmethylene diisocyanate.

7. As new composition of matter, the resinous polyurethane reaction product of 2,5-dimethyl-2,5-di(2'-hydroxyethoxy)-3-hexyne and cyclohexylene-1,4 diisocyanate.

8. The method of making polyurethane resins which comprises reacting approximately equal molecular amounts of 2,5-dimethyl-2,5-di(2'-hydroxyethoxy)-3-hexyne and a polyisocyanate in an organic liquid medium inert with respect to said reactants and products of reaction, said polyisocyanate being selected from the group consisting of aliphatic, aromatic, and cycloalkylene polyisocyanates.

References Cited in the file of this patent
UNITED STATES PATENTS 2,284,896    Hanford et al. ---------- June 2, 1942